United States Patent [19]

Shinn

[11] 4,240,311

[45] Dec. 23, 1980

[54] QUARTZ CRYSTAL RESONATOR

[75] Inventor: William T. Shinn, Ft. Lauderdale, Fla.

[73] Assignee: Motorola, Inc., Schaumburg, Ill.

[21] Appl. No.: 970,834

[22] Filed: Dec. 18, 1978

Related U.S. Application Data

[62] Division of Ser. No. 826,488, Aug. 22, 1977, abandoned.

[51] Int. Cl.[3] .................... B23B 5/40

[52] U.S. Cl. .................... 82/12; 51/217 R

[58] Field of Search .................... 82/12; 51/217

[56] References Cited

U.S. PATENT DOCUMENTS

| | | | |
|---|---|---|---|
| 3,079,732 | 3/1963 | Rawstron et al. | 82/12 X |
| 3,079,737 | 3/1963 | Kratt et al. | 51/217 |
| 3,738,204 | 6/1973 | Spriggs | 82/12 X |
| 3,835,588 | 9/1974 | Whitham | 82/12 X |
| 4,134,315 | 1/1979 | Bendini | 82/12 X |

*Primary Examiner*—Leonidas Vlachos

*Attorney, Agent, or Firm*—Rolland R. Hackbart; James W. Gillman

[57] ABSTRACT

A quartz crystal resonator adapted to resonate in the thickness shear mode has a wafer with a sculptured recessed portion on at least one surface. The recessed portion can be exceptionally thin without loss of structural integrity to produce relatively high frequency fundamental crystals. A novel apparatus is used to machine the central portion of the major surface of the flat wafer to form a recessed portion.

3 Claims, 4 Drawing Figures

QUARTZ CRYSTAL RESONATOR

This is a division of application Ser. No. 826,488, filed Aug. 22, 1977, now abandoned.

BACKGROUND OF THE INVENTION

1. Field of the Invention

This invention relates to a resonating device, and more particularly, to an improved quartz crystal resonator and machine for an improved quartz crystal resonator.

2. Description of the Prior Art

In the prior art, quartz crystal resonators adapted to resonate in the thickness shear mode of vibration at fundamental frequencies have been reliably constructed for operation at frequencies as high as twenty-five megaHertz. In order to make resonators that operate at fundamental frequencies higher than twenty-five megaHertz, the quartz wafer becomes increasingly thinner resulting in a number of problems. First of all, the major surfaces of the quartz wafer must be precisely flat and parallel or there will be several portions of the wafer that tend to resonate causing spurious responses. The thinness of the quartz wafer makes it very fragile and subject to breakage during handling and manufacture. The thin wafer is also very difficult to mount and securely support such that it is not damaged during normal usage.

Another way to obtain frequencies higher than twenty-five megaHertz is to operate a quartz crystal resonator at the third harmonic of its fundamental frequency. Theoretically, a quartz wafer can resonate at odd harmonics of its fundamental frequency, but harmonic operation is difficult to achieve since the quartz wafer has a strong propensity to oscillate at its fundamental frequency. Thus, odd harmonic operation of the quartz wafer is difficult to achieve and requires more complex oscillator circuitry than for fundamental operation. Also, the delta-f-parameter (frequency shift resulting from circuit impedance change) is much more easily maximized and controlled with a fundamental crystal. This is an important consideration in modulating and tuning an oscillator.

For the foregoing and other shortcomings and problems, there has been a long felt need for an improved quartz crystal resonator.

SUMMARY OF THE INVENTION

Accordingly, it is an object of the present invention to provide an improved quartz crystal resonator that is capable of operation at relatively high fundamental frequencies.

It is another object of the present invention to provide an improved quartz crystal resonator that is inexpensive and easily manufactured.

According to the present invention, apparatus for providing a recessed portion in the surfaces of a wafer includes a rotary shaft having means for holding the wafer at one end, means for rotating the rotary shaft, machining means for machining the major surfaces of the wafer to form a recessed portion of a predetermined shape, and measuring means for adjusting the thickness of the machined recessed portion. The machining means further includes means for machining a spherical, convex recessed portion in the major surfaces of the wafer.

Additional features, objects and advantages of the present invention will be more clearly apprehended from the following detailed description together with the accompanying drawings.

DESCRIPTION OF THE PREFERRED EMBODIMENT

Figure 1:
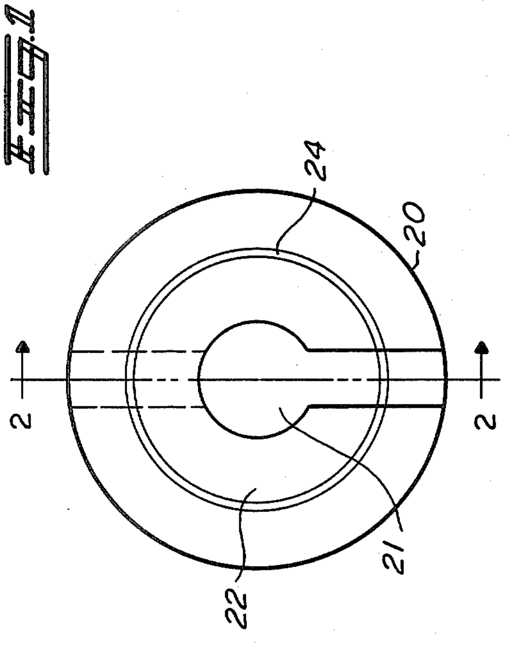
FIG. 1 is a planar view of the quartz crystal resonator in accordance with the present invention.

Referring now to FIG. 1, a quartz crystal resonator, embodying the present invention, is shown which includes a quartz resonating wafer 20 having opposite flat major surfaces wherein at least one of the major surfaces has a recessed portion 22 of a predetermined shape. The recessed portion 22 can be of any practical shape, for example, circular and flat or spherical and convex. An active area of the wafer 20 is defined by the recessed portion 22 and a pair of opposite circular electrodes 21 having leg portions which extend to the periphery of the wafer 20 for external connection to leads. The quartz crystal resonator is adapted to resonate in the thickness shear mode of vibration at relatively high fundamental frequencies, for example, five hundred kiloHertz to in excess of fifty megaHertz. The quartz crystal resonator of the present invention is particularly well adapted to resonate in the fundamental mode at the highest of these frequencies which heretofore were not obtainable by conventional methods.

Figure 3:
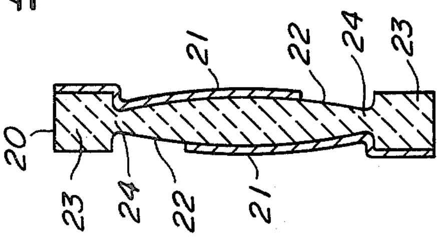
FIG. 3 is a cross-section of a quartz crystal resonator having a pair of opposite recessed portions.
Figure 2:
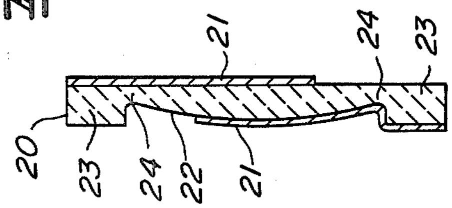
FIG. 2 is a cross-section taken substantially along the line 2—2 of FIG. 1.

Referring now to FIGS. 2 and 3, a cross-section of a quartz crystal resonator in accordance with the present invention is shown where in FIG. 2 the wafer 20 has a single recessed portion 22 and in FIG. 3 the wafer 20 has a pair of opposite recessed portions 22. The recessed portion 22 is machined out of a flat quartz wafer 20, as will be explained hereinafter. Electrodes 21 are deposited on the crystal wafer 20 after the recessed portion 22 has been machined.

In the preferred embodiment, the recessed portion 22 is spherical and convex, although any practical shape can be utilized in practicing the present invention. The resonator tends to vibrate where the wafer 20 is the thickest or where the mass loading is the greatest. Thus, with a spherical, convex recessed portion 22, the vibration of the quartz crystal resonator is concentrated at the center of the spherical, convex recessed portion 22. Spurious responses are greatly reduced by concentrating the resonating energy at the center of the spherical, convex recessed portion 22.

The recessed portion 22 is surrounded at the periphery by a thicker portion 23 of the quartz wafer 20. The peripheral portion 23 not only strengthen the crystal wafer 20, but also reduces damping and spurious responses caused by the particular mounting method employed to support the quartz wafer 20. A reduction of section thickness 24 isolates the recessed portion 22 containing the active area of the wafer 20 by reflecting energy back toward the center of the recessed portion 22.

As the frequency of the quartz crystal resonator is increased, the quartz wafer 20 becomes thinner and thinner. A thin crystal wafer 20 presents many handling and manufacturing problems due to its fragility. However, in the quartz crystal resonator of the present invention, only the recessed portion 22 of the quartz wafer 20 is machined thin to produce a high frequency quartz crystal resonator, while peripheral portion 23, remaining as thick as the original quartz wafer 20, imparts both strength and support to the thin recessed portion 22. Very high frequency quartz crystal resonators, and in particular, resonators operating in the fundamental mode of vibration, can be obtained with the present invention that were not realizable with conventional methods. Since the fragility of the quartz wafer is no longer a problem, special handling and manufacturing methods are not required and a relatively inexpensive quartz crystal resonator can be readily produced with conventional techniques and equipment.

Due to the strength and activity isolation provided by the peripheral portion 23 of the quartz wafer 20, the quartz crystal resonator can advantageously utilize any practical mounting method. For example, leads can be attached by spring clips or bonded to the electrodes 21 of the quartz wafer 20 which then can be further mounted in a metal can or directly in a particular circuit. In addition, covers as shown in copending application filed July 20, 1977, Ser. No. 817,417, entitled, "Piezoelectric Resonating Device," by W. T. Shinn, can be bonded to the peripheral portion 23 of the quartz wafer 20 after which leads can be soldered to the exposed leg portions of the electrodes 21. A quartz crystal resonator sealed by covers in this manner can then be mounted in a wide variety of packages and devices.

According to another embodiment of the present invention, the recessed portion 22 of the quartz wafer 20 is circular and flat. However, in order to eliminate spurious responses due to surface imperfections, the circular, flat recessed portion 22 must be precisely flat and parallel to the opposite major surface of the wafer 20.

Figure 4:
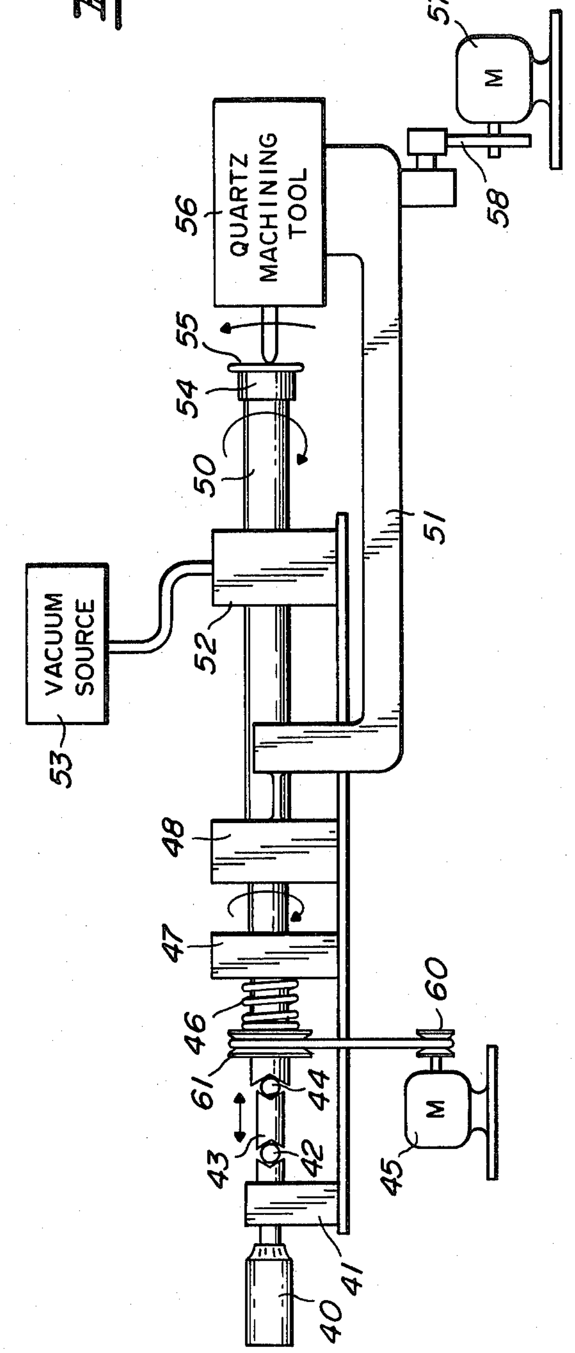
FIG. 4 shows a machine for providing a recessed portion in a quartz wafer.

Referring now to FIG. 4, a machine for providing a spherical, convex recessed portion 22 in a quartz wafer 20 (see FIG. 2) is shown. Generally speaking, a flat quartz wafer 55 is held to the rotatable shaft 50 by vacuum chuck 54. The quartz machining tool 56 is moved up and down through an arc of a circle, whose radius is defined by arm 51 and pivot support 48, to machine the surface of the wafer 55 to form a spherical, convex recessed portion. The arcuate surface of the recessed portion is preferably formed from a substantially long radius arm 51, for example, a radius arm 51 in excess of twelve inches is used to provide a recessed portion of arc length on the order of one to four tenths of an inch so that a relatively thin wafer 55 is not excessively thin at the periphery of the recessed portion. The thickness of the recessed portion machined in the surface of the wafer 55 is adjusted by the micrometer 40. Good quality quartz crystal resonators in accordance with the present invention can be economically fabricated with the machine illustrated in FIG. 4.

The detailed operation of the machine of FIG. 4 will be better apprehended from the following detailed description. A motor 45 is coupled to the rotatable shaft 50 by pulleys 60 and 61 and their associated drive belt for rotating the rotatable shaft 50 at relatively high speeds. The rotatable shaft 50 is fixedly held by supports 47 and 52 which also include bearings for allowing unimpeded rotation of the rotatable shaft 50. A vacuum source 53 is coupled to a circular slot in the rotatable shaft 50 through the bearing support 52. The bearings in the support 52 are arranged in the slot of the rotatable shaft 50. The vacuum is applied through the rotatable shaft 50 to the vacuum chuck 54 for holding the quartz wafer 55.

The quartz machining tool 56 is mounted to one end of the radius arm 51 whose other end is pivotally mounted to the support 48. A motor 57 is coupled to the radius arm 51 by eccentric cam and cam follower 58 for moving the quartz machining tool 56 up and down in the vertical axis.

The micrometer 40 is used for adjusting the thickness of the recessed portion machined in the wafer 55 and is fixedly held by support 41 and coupled to the rotatable shaft 50 by ball bearings 42 and 44 and intermediate shaft 43. The shaft of the micrometer 40, the intermediate shaft 43, and the rotatable shaft 50 have concave end portions for engaging the ball bearings 42 and 44. A bias force for retaining the ball bearings 42 and 44 between the respective concave end portions is supplied by the spring 46, which engages the bearing support 47 and the pulley 61. The bias force from the spring 46 is applied through the rotatable shaft 50 to the bearings 42 and 44 to retain them in position between the concave end portions of the respective shafts.

Using a machine as described hereinabove, the central portion of one major surface of a quartz wafer, having an 0.450 inch diameter and initial fundamental frequency of 13.5 megaHertz, was machined thin to form a spherical, convex recessed portion. The machined wafer, after being plated with electrodes, resonated at a fundamental frequency of approximately 42.910 megaHertz, more than three times the original resonating frequency of the wafer. In the prior art, frequencies in the range of forty megaHertz are provided by third harmonic operation of a quartz crystal resonator, which is more complex and costly to implement than fundamental operation.

A machine in accordance with the present invention need not be limited to the exemplary embodiment described hereinabove. Other machines can be devised for providing a recessed portion in a wafer by those skilled in the art. Such machines could be arranged to utilize the techniques of ion etching or laser cutting to provide a recessed portion in a crystal wafer.

Likewise, the predetermined shape of the recessed portion in a quartz crystal resonator in accordance with the present invention can be of any practical shape. For example, a laser cutting machine can provide a rectangular recessed portion in a rectangular quartz wafer. Also, the shape, thickness and size of the peripheral portion surrounding or partially surrounding the recessed portion of the quartz wafer can be similarly varied.

The features and advantages of a quartz crystal resonator in accordance with the present invention can be advantageously utilized in many applications for the frequency determining element in a high frequency oscillator. For example, the quartz crystal resonator of the present invention vibrating in the fundamental mode can be used in oscillator circuits for providing the operating frequency of a radio transceiver directly without the use of frequency multiplication.

The foregoing embodiments have been intended as illustrations of the principles of the present invention. Accordingly, other modifications, uses and embodiments can be devised by those skilled in the art without departing from the spirit and scope of the principles of the present invention.

What is claimed is:

1. Apparatus for providing a recessed portion of a predetermined shape in at least one of the major surfaces of a wafer, comprising:

a rotary shaft having first and second end portions, the first end portion being concave and the second end portion having means for holding a wafer;

means for rotating said rotary shaft, said rotating means including bearing means for supporting said rotary shaft, pulley means, and motor means coupled to said rotary shaft by the pulley means for rotating said rotary shaft;

machining means for machining at least one of the major surfaces of the wafer to form a recessed portion of a predetermined shape, said machining means including a machining tool, a radius arm means coupled to the machining tool at one end and a pivot support at the other end, cam means, and motor means coupled to the machining tool by the cam means for pivoting the machining tool through an arc defined by the radius arm means and the pivot support to machine at least one of the major surfaces of the wafer to form a spherical, convex recessed portion; and measuring means for adjusting the thickness of the machined recessed portion of the wafer, said measuring means including micrometer means, support means for supporting the micrometer means, and coupling means for coupling the supported micrometer means to said rotary shaft, said coupling means further including spring means, first and second ball bearings and an intermediate shaft with concave first and second end portions, the micrometer means including a shaft with a concave end portion, the first ball bearing engaging the concave end portion of the micrometer shaft and the concave first end portion of the intermediate shaft, the second ball bearing engaging the concave second end portion of the intermediate shaft and the concave first end portion of said rotary shaft, and the spring means engaging the support means and providing a bias force for retaining the first and second ball bearings between the respective concave end portions.

2. The apparatus according to claim 1, including vacuum means coupled to said rotary shaft by the bearing means and the wafer holding means includes vacuum chuck means for holding the wafer to the second end of said rotary shaft by vacuum pressure from the vacuum means.

3. The apparatus according to claim 1, wherein the radius arm means is a radius arm member that is at least twelve inches long from end to end for pivoting the machining tool through an arc defined by the radius arm member and the pivot support to machine at least one of the major surfaces of the wafer to form a spherical, convex recessed portion.

* * * * *